United States Patent
Koike et al.

(10) Patent No.: US 8,201,017 B2
(45) Date of Patent: Jun. 12, 2012

(54) METHOD FOR QUEUING MESSAGE AND PROGRAM RECORDING MEDIUM THEREOF

(75) Inventors: Yasuo Koike, Kawasaki (JP); Tamaki Tanaka, Kawasaki (JP); Shoji Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 79 days.

(21) Appl. No.: 12/493,873

(22) Filed: Jun. 29, 2009

(65) Prior Publication Data

US 2010/0083031 A1     Apr. 1, 2010

(30) Foreign Application Priority Data

Sep. 30, 2008   (JP) ................................. 2008-252315

(51) Int. Cl.
*G06F 11/00*   (2006.01)
(52) U.S. Cl. .......................... 714/4.1; 710/112; 370/312
(58) Field of Classification Search ...... 714/4; 719/314; 370/229, 230, 312, 432

See application file for complete search history.

(56) References Cited

U.S. PATENT DOCUMENTS

| | | | | |
|---|---|---|---|---|
| 5,964,876 A * | 10/1999 | Shimomura et al. | ............ | 726/33 |
| 5,974,114 A * | 10/1999 | Blum et al. | .................... | 379/9 |
| 5,978,933 A * | 11/1999 | Wyld et al. | .................... | 714/13 |
| 6,012,151 A * | 1/2000 | Mano | .............................. | 714/11 |
| 6,182,109 B1 * | 1/2001 | Sharma et al. | ................ | 718/104 |
| 2008/0163249 A1* | 7/2008 | Garza et al. | ................... | 719/314 |
| 2008/0301709 A1* | 12/2008 | Ban | ................................ | 719/314 |

FOREIGN PATENT DOCUMENTS

| | | |
|---|---|---|
| JP | A 4-180425 | 6/1992 |
| JP | A 8-106440 | 4/1996 |
| JP | A 2001-227219 | 8/2001 |

* cited by examiner

*Primary Examiner* — Marc Duncan
(74) *Attorney, Agent, or Firm* — Greer, Burns & Crain, Ltd.

(57) ABSTRACT

According to an aspect of the embodiment, a message queuing unit of the message processing apparatus stores received messages. A message reception control unit receives a notification of destinations of messages, extracts only the messages for current processes based on a process control table recording current or standby of processes, and transmits the messages to corresponding applications as current processes. On the other hand, the message reception control unit does not transmit the messages to the applications as standby processes.

3 Claims, 11 Drawing Sheets

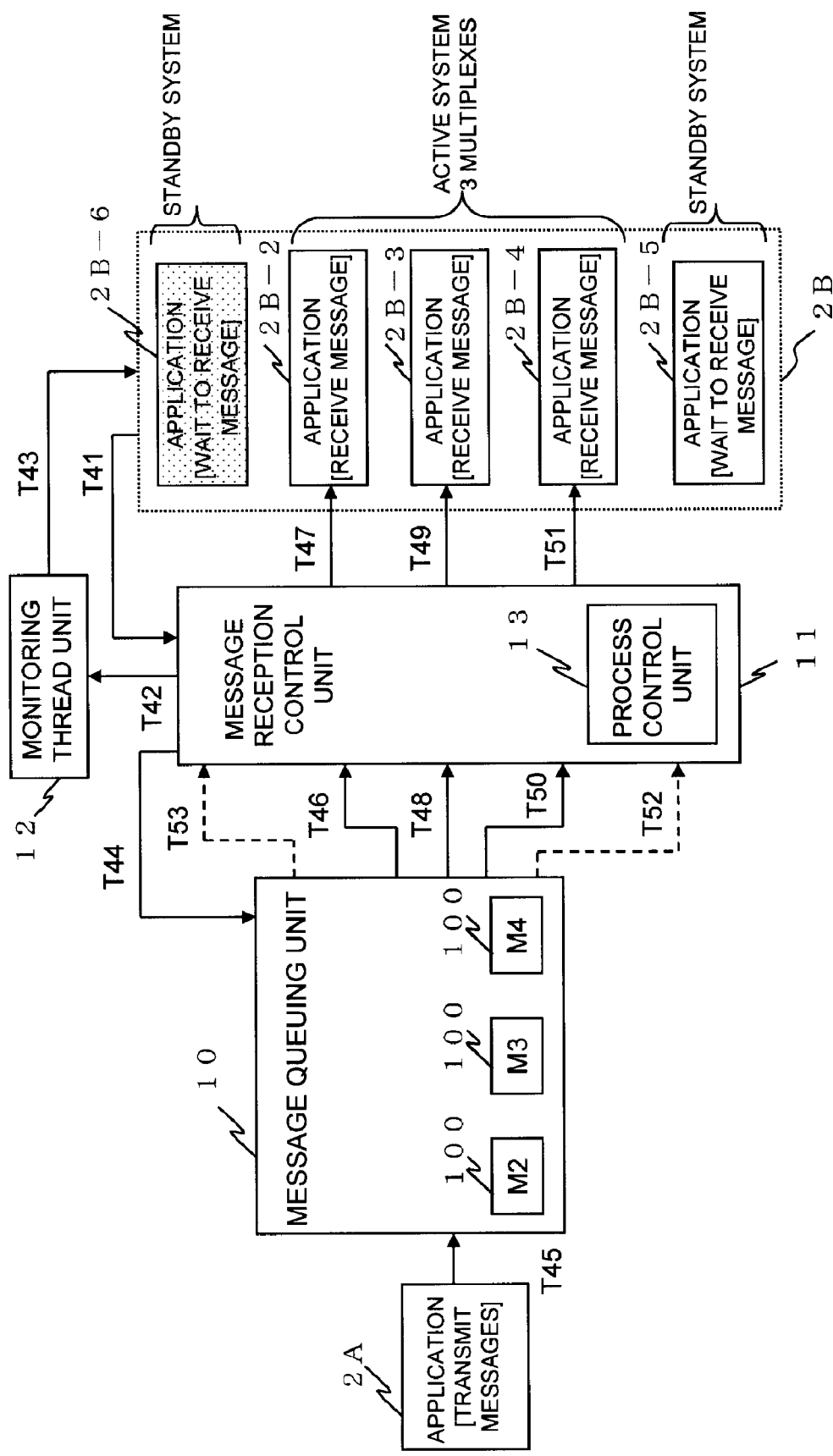

METHOD FOR QUEUING MESSAGE AND PROGRAM RECORDING MEDIUM THEREOF

CROSS-REFERENCE TO RELATED APPLICATIONS

This application is based upon and claims the benefit of priority of the prior Japanese Patent Application No. 2008-252315, filed on Sep. 30, 2008, the entire contents of which are incorporated herein by reference.

FIELD

The embodiments discussed herein are related to method for queuing a message and a program recording medium thereof.

BACKGROUND

A computer system, such as a stock trading system, in which stop of operation is not permitted, is referred to as mission critical. The computer system needs to be redundant to improve the reliability in a mission-critical computer system. Examples of techniques for making the system redundant include the following.

A first method is a method for making processes of applications redundant. The method is for replacing the processes so that the execution multiplicity of the processes becomes constant. In other words, two or more processes of an application are prepared, and a hot standby configuration is formed process by process. Specifically, two systems with the same configuration are prepared in the method, one system is set as a current system and operated, and the other system is set as a standby system and operated in the same way, while being set to a standby state. The standby system is always maintained in the same state with the current system, and when a failure occurs in the current system, the standby system quickly takes over the process.

A second method is a method for making the servers redundant. In the method, systems with the same configuration are prepared server by server, and a hot standby configuration is established.

There is known a communication system for communication between computers in which only the packets from specific processes can be preferentially processed in the terminals of a network system.

There is also known a remote control apparatus which can activate a lock knob when a new code is registered to display the registration of a new code signal.

There is also known a distributed shared memory calculation system which can realize the consistency guarantee control and the synchronous control with few network packets to effectively use the network resources, and can improve the performance to access the distributed shared memory.

Patent Document 1: Japanese Patent Laid-Open No. 4-180425
Patent Document 2: Japanese Patent Laid-Open No. 2001-227219
Patent Document 3: Japanese Patent Laid-Open No. 8-106440

SUMMARY

According to an aspect of the embodiment, a method is used for queuing a message in a computer, which executes transmission and reception of messages between a transmission application that transmits messages and a plurality of reception applications that are multiplexed and receive the messages. The message queuing method includes: acquiring a maximum current number and activated processes that are activated, the maximum current number indicating a maximum number of processes that can be set as current for the reception applications, and thereby setting a state of one of current and standby for each activated process in a process control table; applying a queuing process to a message from the transmission application; and maintaining a state in which communication with all processes set in the process control table is possible, and extracting and transmitting the queued message only to the processes which are set as current.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates a third processing in the present embodiment;

DESCRIPTION OF EMBODIMENTS

Figure 1:
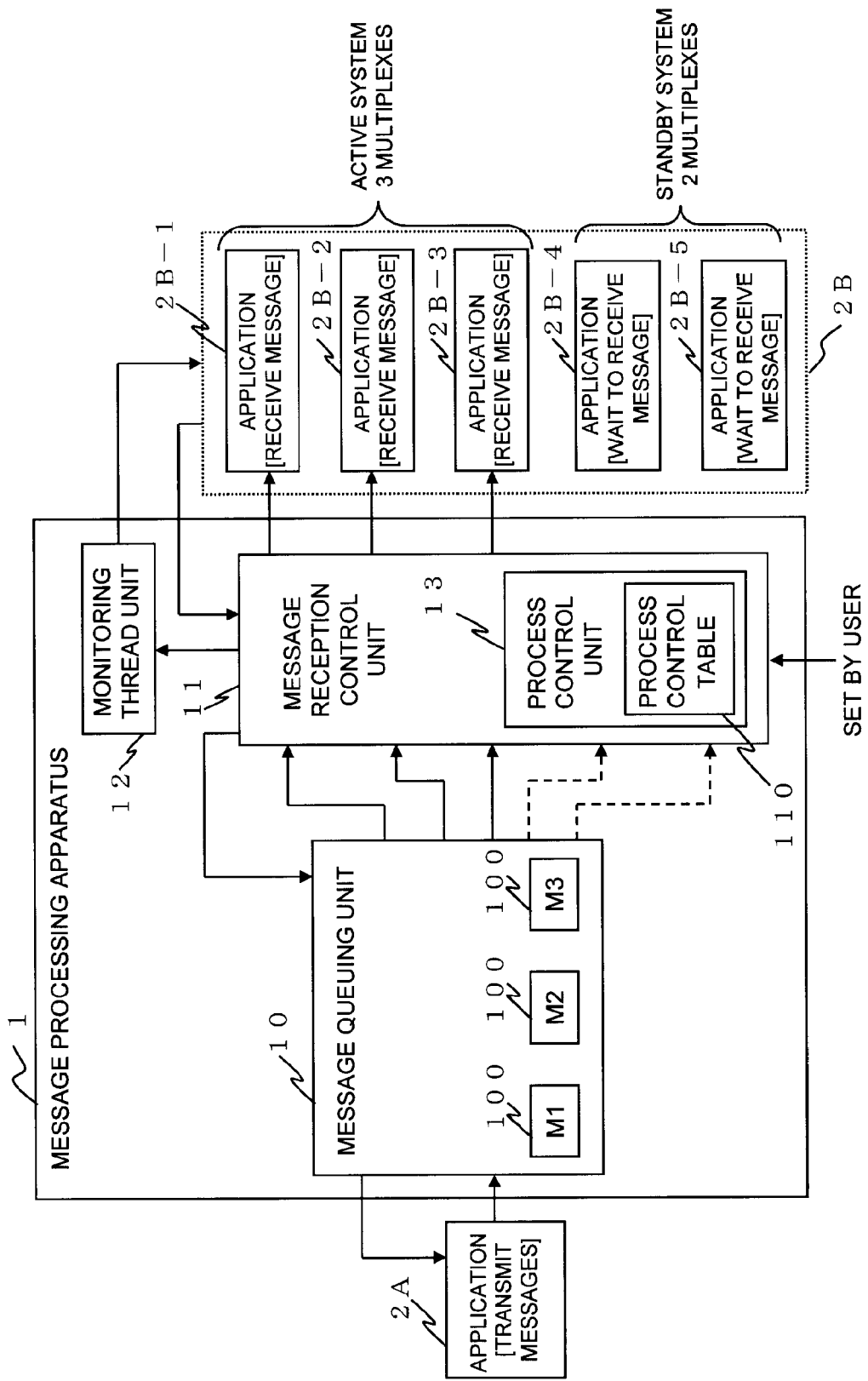
FIG. 1 illustrates a structure of an information processing apparatus according to the present embodiment.

The states of each other do not have to be recognized between applications on the transmission side and the receiving side in a system of a server that associates the applications using a message queue. However, according to our study, the following problems exist in making the applications on the receiving side redundant.

First, the system requires time to recover the throughput per time after an application on the receiving side is abnormally terminated. There is a problem that it takes time for the system to recover the original throughput due to the process activation and the initialization process when the number of processes the same as the abnormally terminated applications are rebooted. As a result, I/O (Input/Output) and the like during the restart adversely affects the performance of the applications in progress, which can be a problem in a system and the like in which the performance is important.

Second, two or more exactly the same application programs need to be prepared in the method in which a hot standby configuration is set process by process for the applications. However, a process for inhibiting the reception from a message queue needs to be installed in the standby processes in an application using a PULL-type message queue, or a message process in which an application on the receiving side requests a message.

A message queuing method between applications is provided and disclosed which associate redundant applications capable of eliminating the influence on the performance of other processes upon the process activation.

A computer readable recording medium recording a message queuing program for executing message queuing between applications is provided and disclosed which associate redundant applications capable of eliminating the influence on the performance of other processes upon the process activation.

The disclosed message queuing method and the program realize message transmission control in which only processes which are set as current among the activated processes of the reception applications receive a message from the transmission application, and the message of the transmission application are not transmitted to the processes which are set as standby.

Thus, there is no need to implement a function for not receiving messages in the standby processes of the reception applications, so that the process redundancy can be easily realized without affecting other activated processes. More specifically, a plurality of processes made redundant in advance are activated. Thus, there is a little time loss until the business transaction recovery due to the initialization processing and the like, and a quick restart of business transactions can be realized. The influence on the performance of other processes upon the process activation can also be eliminated. Furthermore, the independence of applications can be improved, because additional programs for executing processes corresponding to the redundant configurations are not necessary in the reception applications.

Preferred embodiments of the present invention will be explained with reference to accompanying drawings.

FIG. 1 illustrates an example of a structure of an information processing apparatus according to the present embodiment.

The information processing apparatus of FIG. 1 is a computer system including a message processing apparatus 1 and a plurality of applications 2. The message processing apparatus 1 includes a message queuing unit 10, a message reception control unit 11, and a monitoring thread unit 12. The message reception control unit 11 includes a process control unit 13. The applications 2 are programs executed on the computer, and, in practice, executed on processes (or threads) generated in the computer. Thus, the applications 2 are also called processes of the applications 2. An application 2 on the transmission side is expressed with character A, and applications 2 on the receiving side are expressed with character B.

In the computer system, the message processing apparatus 1 executes a message queuing process to transmit messages 100 from the application 2A on the transmission side to the applications 2B on the receiving side.

The message processing apparatus 1 and the applications 2A and/or 2B may be arranged on different computers. For example, the message processing apparatus 1 may be arranged on a server, and another computer (client machine) connected to the server may execute one or both of the application 2A on the transmission side and the applications 2B on the receiving side through a network.

The applications 2B on the receiving side are made redundant. The message processing apparatus 1 accepts an input of "user's setting" from the user in advance for the redundancy. A redundant configuration of the applications 2B on the receiving side is specified by the "user's setting". It is assumed in the embodiment of the present embodiment that the number of applications 2B on the receiving side is set to "5" and the number of multiplexes (the number of applications existing in parallel or simultaneously, the same applies hereinafter) of the current applications is set to "3 multiplexes" in the "user's setting". Thus, the number of multiplexes of the applications 2B of a standby system is "2 multiplexes". The maximum value of the number of current applications 2B is a maximum current number, in other words, the maximum number of current processes. The maximum current number is a maximum value of the number of processes for which executes the applications 2B on the receiving side and which can be set as current in parallel or simultaneously.

Based on the "user's setting", the message processing apparatus 1 executes a message process in the order of generation of processes of the applications 2B (in the order of generation of 2B-1 to 2B-5 with 2B-1 being the first), in which there are three current processes and two standby processes. The application 2B generated first will be illustrated as an application 2B-1, and the applications are illustrated as applications 2B-1 to 2B-5 in the order of generation. Processes that will execute the applications 2B are actually generated. The message process is for transmitting and receiving a message between the application 2A on the transmission side and the current processes of the plurality of applications 2B on the receiving side by message queuing.

The message queuing unit 10 receives the messages 100 transmitted from the application 2A on the transmission side to the applications 2B on the receiving side and temporarily stores the messages 100.

The message queuing unit 10 notifies destinations (communication paths and the like) of the stored messages 100 to the message reception control unit 11. The message queuing unit 10 extracts the stored messages 100 when there is a transmission request of the messages 100 from the message reception control unit 11, and transmits the extracted messages 100 to the message reception control unit 11.

The message 100 transmitted to the application 2B-1 is referred to as M1, the message 100 transmitted to the application 2B-2 is referred to as M2, and the message 100 transmitted to the application 2B-3 is referred to as M3.

The message reception control unit 11 receives the notification of the destinations (communication paths and the like) of the stored messages 100 from the message queuing unit 10. Based on a process control table 110 included in the process control unit 13, the message reception control unit 11 determines to extract the stored messages 100 from the destinations of the messages 100, and transmits the extracted messages 100 to corresponding applications 2B.

Specifically, the message reception control unit 11 extracts the messages 100 (M1, M2, and M3) for only the applications which are current processes from the destinations of the stored messages 100, based on the process control table 110. And then, the message reception control unit 11 transmits the extracted messages 100 (M1, M2, and M3) to the applications 2B-1, 2B-2, and 2B-3 which are current processes, respectively. On the other hand, when the destinations of the messages 100 stored by the message queuing unit 10 are the applications 2B-4 and 2B-5 as standby processes, the message reception control unit 11 does not extract and does not transmit the messages 100 for the applications 2B-4 and 2B-5.

The monitoring thread unit 12 monitors a communication state and the like between the message reception control unit 11 and the applications 2B on the receiving side in a predetermined unit of monitoring threads. The monitoring thread unit 12 monitors the process state of the applications 2B on the receiving side based on the monitoring threads. And then, the monitoring thread unit 12 notifies a change (generation of process, abnormal termination, etc.) in the process state of the applications 2B on the receiving side to the message reception control unit 11. In this way, the message reception control unit 11 can monitor the process state of the applications 2B.

The process control unit 13 includes the process control table 110 for determining whether to transmit the messages and manages current processes and standby processes of the plurality of applications 2B.

A structure and details of the process control table 110 will be described in the description of FIG. 5 below. The operation of the embodiment illustrated in FIG. 1 will be described in the description of operations of FIGS. 2 to 4.

According to the present embodiment illustrated in FIG. 1, it is not needed to distinguish or recognize for the applications 2B whether the processes are current processes or standby processes. In other words, the message processing apparatus 1 manages whether the processes are current processes or standby processes, and determines whether or not to transmit the messages. Thus, the applications 2B on the receiving side just wait for the reception of the messages. Accordingly, the processes of the applications 2B do not have to be created while distinguishing between current and standby. This can secure the independence of the applications 2B.

Figure 2:
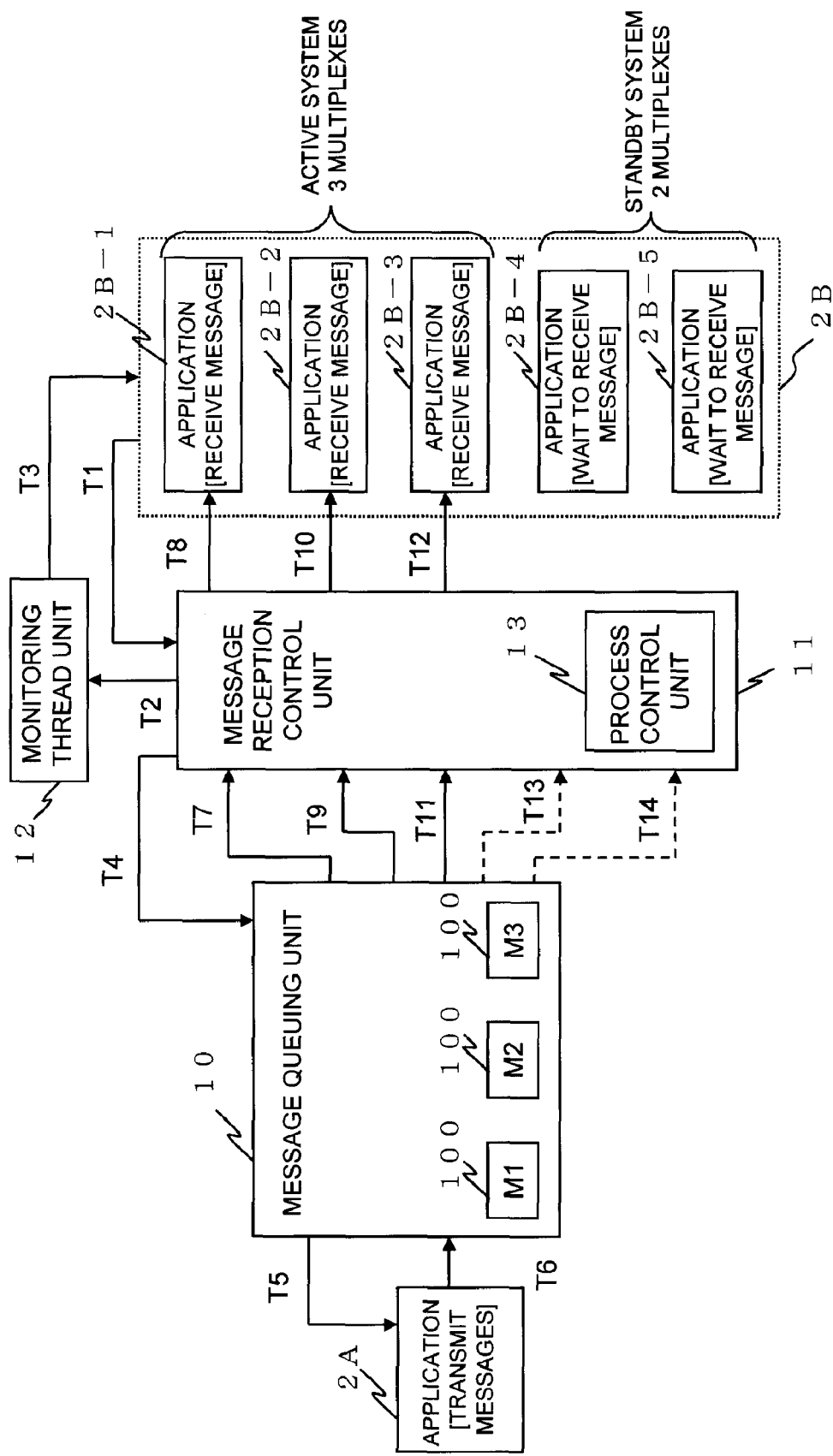
FIG. 2 illustrates a first processing in the present embodiment.

FIG. 2 illustrates a processing (first processing) when the applications 2B-1 to 2B-5 are connected to the message reception control unit 11.

The user activates a necessary number of multiplexes of the processes of the same applications 2B on the message receiving side in advance. For example, the user sets the number of applications 2B on the receiving side to "5" in advance in FIG. 2, and sets the number of multiplexes of the applications 2B, which are current, to "3 multiplexes". The multiple applications 2B-1 to 2B-5 are activated based on the setting.

The applications 2B notify the generation of processes to the message reception control unit 11 (process T1). The message reception control unit 11 generates monitoring threads for the generated processes of the applications 2B (process T2), and the monitoring thread unit 12 monitors the state of the processes of the applications 2B based on the generated monitoring threads (process T3).

After the generation of the processes of the applications 2B, the process control unit 13 stores the data for managing the processes of the applications 2B-1 to 2B-5 in the process control table 110 in the order of generation of processes.

The message reception control unit 11 requests the message queuing unit 10 for the reception of the messages 100 (M1, M2, and M3) of the applications 2B-1 to 2B-3, which are current processes (process T4).

The message queuing unit 10 notifies the application 2A on the transmission side that the reception of the messages 100 (M1, M2, and M3) are permitted (process T5).

After receiving the notification of the reception permission of the messages 100, the application 2A on the transmission side transmits the messages M1, M2, and M3 to the message processing apparatus 1 (process T6). The message queuing unit 10 of the message processing apparatus 1 receives the messages M1 to M3 and executes a queuing process (processing of queue) of the received messages M1 to M3.

After receiving the message M1, the message queuing unit 10 notifies the message reception control unit 11 that the message M1 is stored. The message reception control unit 11 that has received the notification extracts the message M1 from the message queuing unit 10 (process T7).

The message reception control unit 11 transmits the extracted message M1 to the application 2B-1, which is the current process (process T8). The messages M2 and M3 are subjected to the same processes (processes T9 and T10 and processes T11 and T12).

On the other hand, the message reception control unit 11 does not extract the messages of the applications 2B-4 and 2B-5 as standby processes (processes T13 and T14).

Since the message reception control unit 11 does not transmit the messages 100 to the applications 2B-4 and 2B-5, the applications 2B-4 and 2B-5 maintain the message reception standby state. The applications 2B-4 and 2B-5 just wait to receive the message, and there is no distinction that the processes are on standby.

Figure 3:
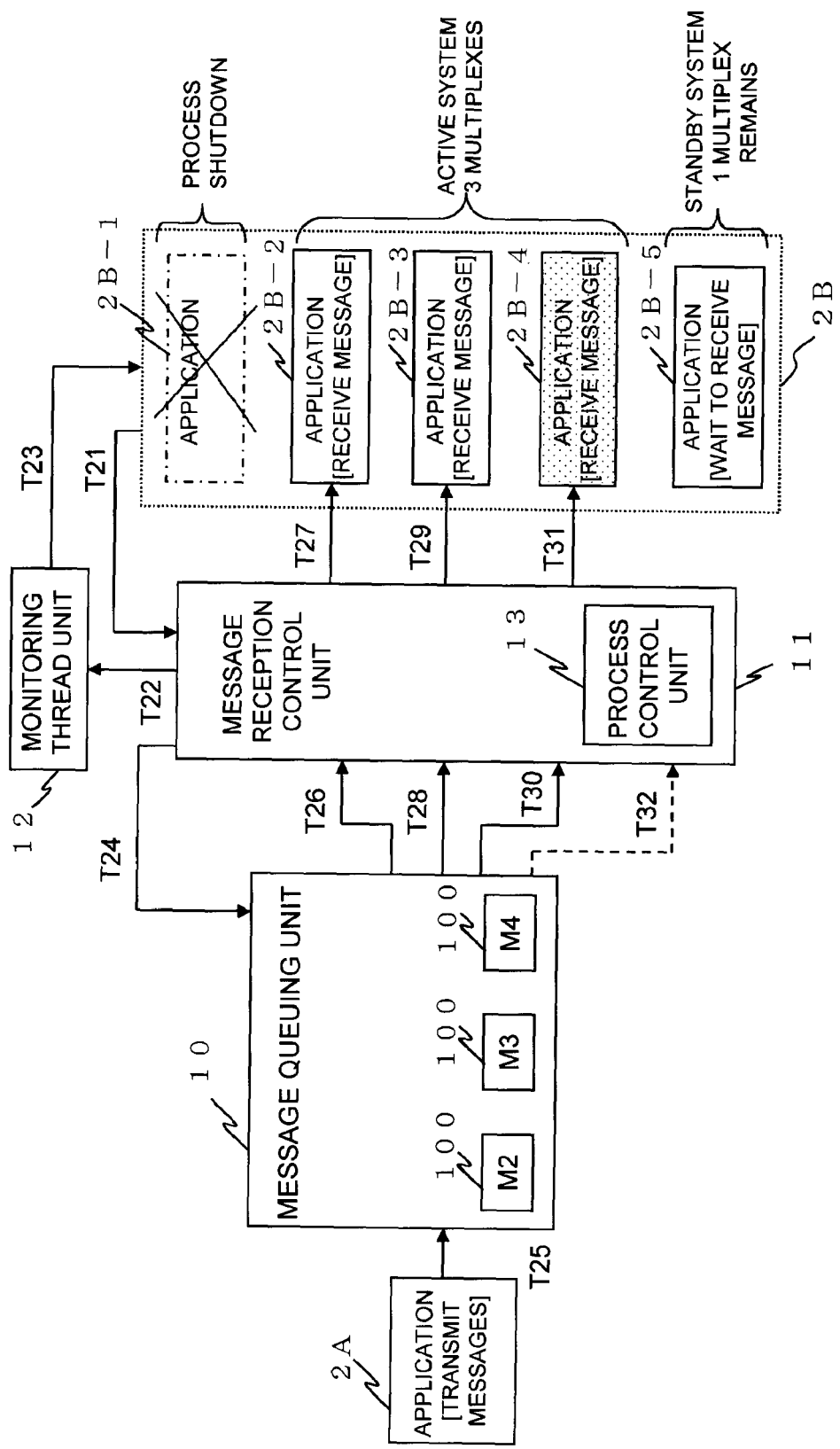
FIG. 3 illustrates a second processing in the present embodiment.

FIG. 3 illustrates a processing (second processing) for promoting a standby process of the applications 2B to a current process when a current process of the applications 2B is failed, which is a current system on the receiving side.

Specifically, FIG. 3 illustrates a process for promoting a standby process to a current process when one of the current processes is failed, in a case that the applications 2B-1 to 2B-3 are set to "3" multiplexes (state of the first processing illustrated in FIG. 2), which are current applications on the receiving side.

When the process of the application 2B-1 which is a current process is failed due to an abnormal termination or the like, the message reception control unit 11 checks the monitoring threads for the generated processes of the applications 2B (process T21). The message reception control unit 11 queries the monitoring thread unit 12 (process T22).

The monitoring thread unit 12 monitors the process state of the applications 2B (process T23), determines that the process of the application 2B-1 is failed, and notifies the state to the message reception control unit 11.

After receiving the notification, the process control unit 13 of the message reception control unit 11 deletes data corresponding to the process of the application 2B-1 from the process control table 110.

The message reception control unit 11 recognizes that the number of the current processes is changed to "2", and updates data for promoting the process of the application 2B-4 from a standby process to a current process on the process control table 110 to maintain the number of the current processes to "3".

Based on the updated process control table 110, the message reception control unit 11 notifies the reception permission of the message 100 of the application 2B-4, which newly becomes a current process, to the message queuing unit 10 (process T24).

After receiving the notification of the reception permission of the message 100, the application 2A on the transmission side transmits the messages M2, M3, and M4 to the message processing apparatus 1 (process T25).

The message queuing unit 10 receives the messages M2 to M4 and executes a queuing process (processing of queue) of the messages M2 to M4 received by the message queuing unit 10. After receiving the message M2, the message queuing unit 10 notifies the message reception control unit 11 that the message M2 is stored.

The message reception control unit 11 that has received the notification extracts the message M2 from the message queuing unit 10 (process T26). The message reception control unit 11 transmits the extracted message M2 to the application 2B-2, which is a current process (process T27). The messages M3 and M4 are subjected to the same processes (processes T28 and T29 and processes T30 and T31).

The message reception control unit 11 does not extract the message of the application 2B-5 as a standby process (process T32). The message reception control unit 11 does not execute a reception process of the message 100 to the application 2B-1, which it is determined that the process is failed.

In this way, the process of the application 2B-4 can be promoted from the standby process to the current process in the message processing apparatus 1, even when the process of the application 2B-1 which is the current process is failed due to an abnormal termination or the like.

As a result, the message processing apparatus 1 can quickly transmit the message M4 to the promoted current process of the application 2B-4 in a message reception standby state.

FIG. 4 illustrates a processing (third processing) by the message reception control unit 11 for making a replacement of a standby process of the applications 2B, after the state in which an current process of the applications 2B which is the current process on the receiving side is failed, and a standby process is promoted to a current process (state of the second processing illustrated in FIG. 3).

The user activates (adds) a new process of an application 2B-6, after the process of the application 2B-1 which is the current process is failed due to an abnormal termination or the like. After the activation of the process, the application 2B-6 notifies the generation of the process to the message reception control unit 11 (process T41). Thus, the message reception control unit 11 accepts the addition of the new process by the applications 2B.

After the notification of the new process activation, the message reception control unit 11 generates a monitoring thread for the process of the application 2B-6 (process T42), and the monitoring thread unit 12 monitors the state of the process of the application 2B-6 by the generated monitoring thread (process T43).

The process control unit 13 that has received the notification adds data corresponding to the process of the application 2B-6 to the process control table 110. Since the number of standby processes has decreased to "1" on the process control table 110, the process control unit 13 updates the process control table 110 to supply the process of the application 2B-6 as a standby process.

Based on the updated process control table 110, the message reception control unit 11 notifies a transmission permission of the messages 100 of the applications 2B-2 to 2B-4, which are the current processes, to the message queuing unit 10 (process T44).

After receiving the notification of the reception permission of the messages 100, the application 2A on the transmission side transmits the messages M2, M3, and M4 to the message processing apparatus 1 (process T45).

The message queuing unit 10 receives the messages M2 to M4 and executes a queuing process (processing of queue) of the received messages M2 to M4. After receiving the message M2, the message queuing unit 10 notifies the message reception control unit 11 that the message M2 is stored. The message reception control unit 11 that has received the notification extracts the message M2 from the message queuing unit 10 (process T46).

The message reception control unit 11 transmits the extracted message M2 to the application 2B-2, which is the current process (process T47). The messages M3 and M4 are subjected to the same processes (processes T48 and T49 and processes T50 and T51). The message reception control unit 11 does not extract the messages 100 of the applications 2B-5 and 2B-6 as standby processes (processes T52 and T53).

In this way, the message processing apparatus 1 can supply a process of an application 2B to the process control table 110 as a current process or a standby process, even when the process is activated later by the user, after connecting the activated application 2B to the message processing apparatus 1. According to the present embodiment, the current processes and the standby processes of the applications 2B are managed in the message processing apparatus 1. Thus, the current process or the standby process can be quickly supplied, and a message processing in the redundant applications 2B can be quickly prepared.

A timing for supplying the application 2B by the user may be a timing which does not affect the operation of the business transaction processing and in which the application 2B is later activated and supplied.

The number of current applications 2B reaches the set number (=3) in the example of FIG. 4, so that the application 2B, which is later supplied, becomes a standby application 2B.

FIG. 5 is an explanatory view of a data structure of the process control table 110 according to the present embodiment.

Figure 5A:
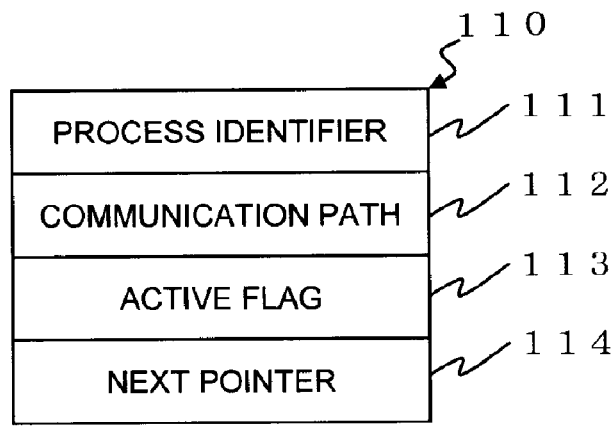
FIGS. 5A and 5B illustrate a data structure of a process control table in the present embodiment.

FIG. 5A illustrates a data structure of the process control table 110 for the message reception control unit 11 to manage receiving destinations of the messages 100. The process control table 110 is constituted by, for each process identifier 111, data at least including a communication path 112 corresponding to the process identifier 111, an current flag 113, and a next pointer 114 as a pointer of the next data.

The process identifier 111 is an identifier for identifying the order of execution of the processes of the applications 2B. The communication path 112 specifies a socket (specify a set of a destination IP address and a port number, etc.).

A data "ON" is set to the current flag 113 when the corresponding process is current, and a data "OFF" is set when the process is standby. A pointer indicating the next process (in the order of generation of processes) of the process is set to the next pointer 114.

The process control unit 13 manages a data link list as the process control table 110, the data link list linking the order of process generation with data configurations including a plurality of data for each process identifier 111. The process control unit 13 adds or deletes data to and from the process control table 110, and links again the data link list illustrated in FIG. 5B.

Figure 5B:
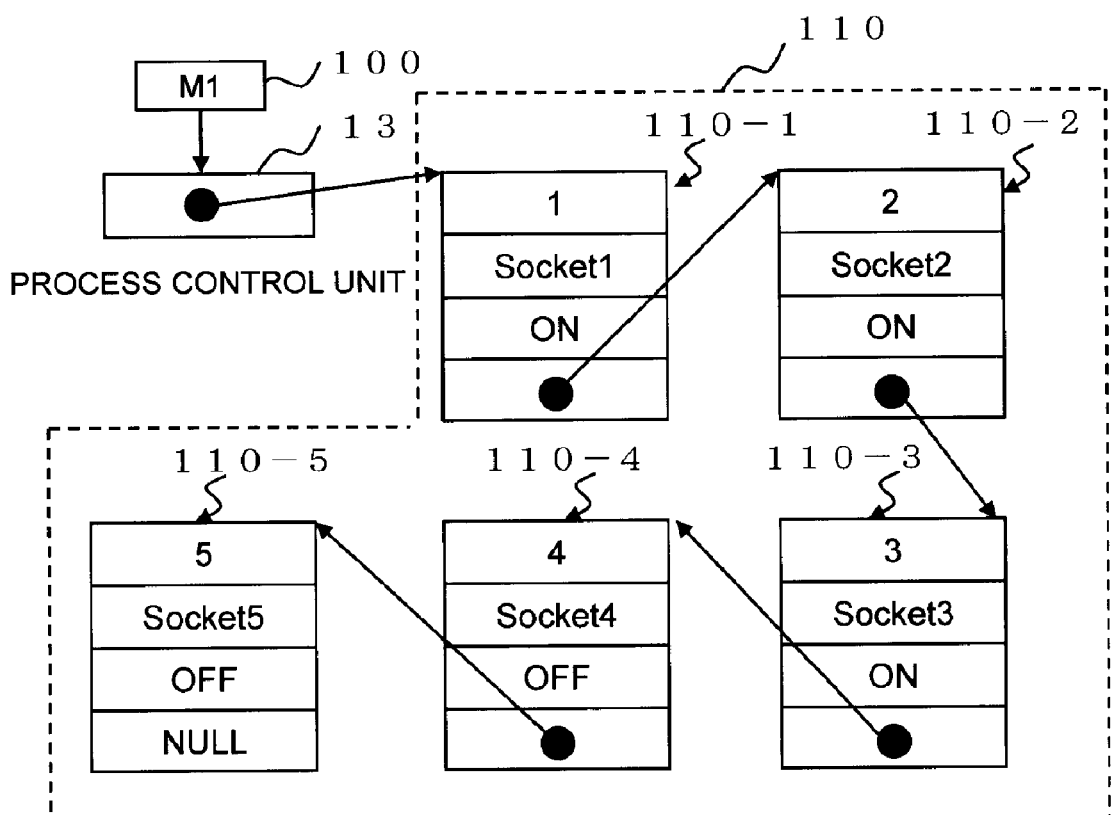

FIG. 5B illustrates an example of the data link list of the process control table 110. FIG. 5B illustrates a data link list of the process control table 110 in the first processing illustrated in FIG. 2.

The process control unit 13 obtains the notification of the generation of processes from the message reception control unit 11. And then, the process control unit 13 sequentially adds data of the processes (illustrated with 110-1 to 110-5 in FIG. 5B) to the process control table 110 in the order of generation of processes, based on the user's setting, for example, current process=3 and standby process=2.

For example, FIG. 5B illustrates that data 110-1 of a current process having a process identifier 111 of "1" in the process control table 110 has a communication path 112 of "socket1" (for example, a socket of a specific destination), and the current flag 113 of "ON" (current process). Similarly, data 110-2 and 110-3 indicate current processes having process identifiers 111 of "2" and "3", respectively.

The current flags 113 are "OFF" in the data of the standby processes, and in the example of FIG. 5B, the data denotes processes in which the process identifiers 111 are "4" and "5" (data 110-4 and 110-5).

The message reception control unit 11 determines the order of generation of processes based on the next pointers 114 of the process control table 110. For example, the next pointers 114 link the order of generation of processes with the data 110-1 as the top of the next pointers 114, followed by the data 110-2, . . . , and data 110-5.

When there is no linked destination of the next pointer 114 of the process identifier 5, "NULL" is set. Thus, the next pointer 114 of the data 110-5 of the process of the last in the order of generation is NULL (null data). In this way, the process control unit 13 links the data 110-1 to 110-5 in the order of generation.

Figure 6A:
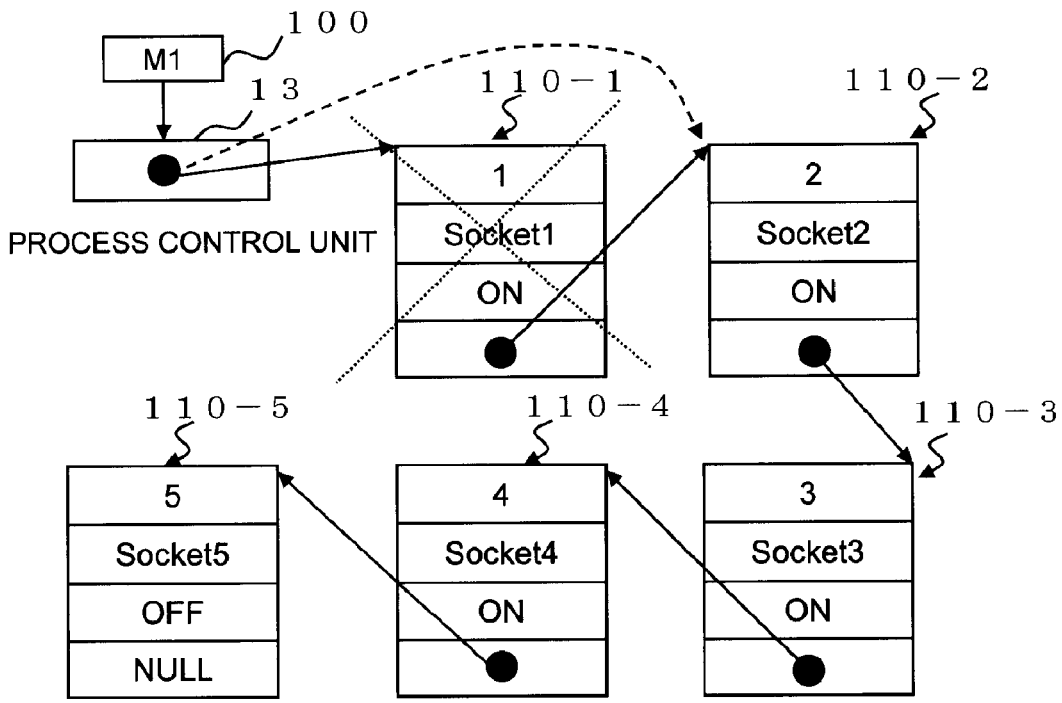
FIGS. 6A and 6B illustrate changes in a data link of the process control table in the present embodiment.
Figure 6B:
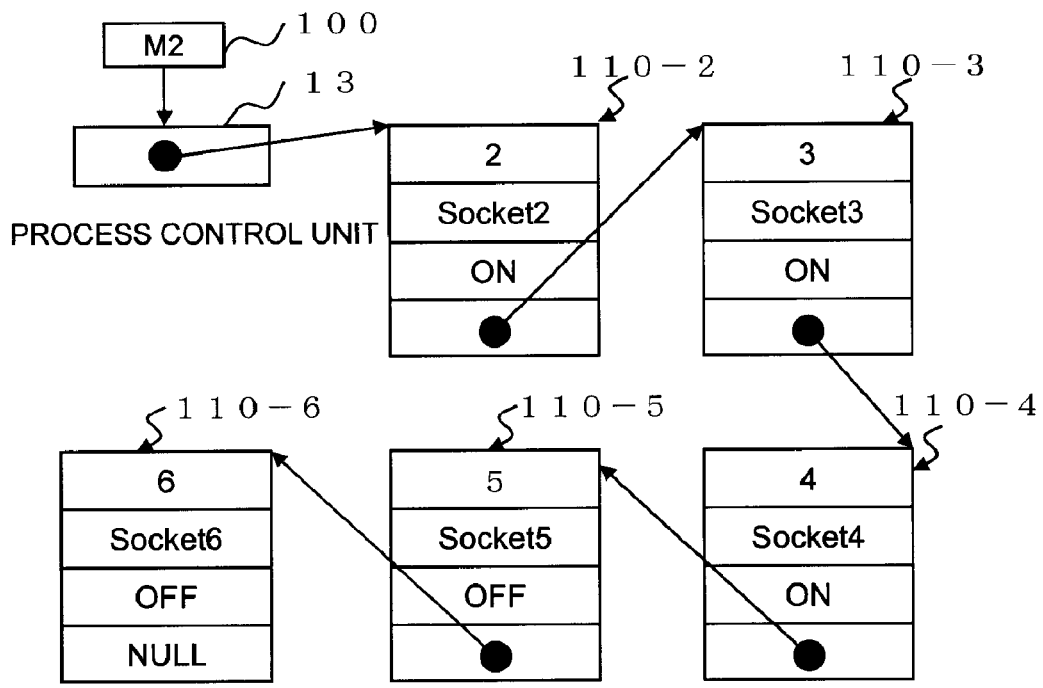

FIG. 6 is an explanatory view for explaining changes in a data link of the process control table 110 in the present embodiment. FIG. 6A is an explanatory view of a change in a data link in the control of process promotion by the message reception control unit 11. FIG. 6B is an explanatory view of a change in a data link in the control of process replacement.

FIG. 6A illustrates an example of a change in the data link of the process control table 110 corresponding to the second processing illustrated in FIG. 3, when one process is failed (abnormal termination) in the state of the current processes and the standby processes, both of which are illustrated in FIG. 5B.

A current process is failed, which has the process identifier 111 of "1" and is a transmission target of the message M1, before the normal termination. Then, the monitoring thread unit 12 recognizes the failure of the current process (2B-1 of FIG. 3), and notifies the information of the failed process to the message reception control unit 11.

Consequently, the process control unit 13 deletes the data 110-1 corresponding to the failed current process from the process control table 110 based on the information notified from the monitoring thread unit 12 through the message reception control unit 11. The process control unit 13 further brings the order of generation of processes to the top of the next pointer 114 of the data 110-2, and links again the data link list.

The process control unit 13 recognizes that the number of the current processes has decreased from "3" to "2" and updates the current flag 113 of the standby process (2B-4 of FIG. 3), in which the process identifier 111 is "4", from "OFF" to "ON" according to the next pointer 114 in the process control table 110 (hereinafter, the process is also called "promotion to current process").

As a result of the process, the message reception control unit 11 can determine that the process having the process identifier 111 of "4" as an current process.

In this way, the process control unit 13 deletes the terminated process from the process control table 110, when a current process of the applications 2B terminates abnormally or normally. After deleting the data 110-1 of the process from the process control table 110, the process control unit 13 updates the link in the data link list.

As a result, the message reception control unit 11 can determine that the process of the applications 2B, which is a standby process waiting to receive the message, is promoted to a current process.

According to the present embodiment, the message processing apparatus 1 can proceed the process of message reception to the applications 2B in a short time when the process of the application 2B is failed.

Whether the processes are current processes or standby processes, and whether or not to transmit the messages is managed only in the message processing apparatus 1. Thus, the applications 2B on the receiving side just wait to receive the messages 100. Accordingly, it is not needed for the applications 2B to create the application which can distinguish the current processes and the standby processes, and then, the independence of the applications 2B can be secured.

FIG. 6B is an explanatory view of an example of changing the data link when one process is replaced in the state of the current processes and standby processes, both of which are illustrated in FIG. 6A. FIG. 6B illustrates the process control table 110 corresponding to the third processing illustrated in FIG. 4.

After the number of activated processes has decreased to "4" as described in FIG. 6A, the process control unit 13 adds data 110-6 to the process control table 110 as follows in relation to the process of the application 2B-6 (illustrated in FIG. 4) activated later by the user (hereinafter, the process is also called "replacement of process"). The number of multiplexes of activated processes set by the user is "5" in this case.

The message reception control unit 11 determines that the number of standby processes has decreased from "2" to "1" based on the process control table 110. The message reception control unit 11 notifies the content notified from the monitoring thread unit 12 to the process control unit 13. Based on the notification, the process control unit 13 adds, to the process control table 110, the data 110-6 corresponding to the process of the application 2B-6 later activated.

After adding the data 110-6 to the process control table 110, the process control unit 13 updates the next pointer 114 of the data 110-5 from "NULL" to the setting of the pointer of the data 110-6 based on the order of generation of processes.

The process control unit 13 links again the data link list after the update of the process control table 110. In this case, the process control unit 13 sets "NULL" to the next pointer 114 of the data 110-6 last in the order of generation.

As a result, the message reception control unit 11 can determine the process of the application 2B-6 as a standby process in the following processes based on the process control table 110.

In this way, the message reception control unit 11 can determine to transmit the messages 100 to the applications 2B (2B-2 to 2B-4), which are the current processes, based on the process control table 110, and not to transmit the messages 100 to the applications 2B (2B-5 and 2B-6) as standby processes.

When the number of processes of the applications 2B decreases below the set value, the message processing apparatus 1 can set the separately activated process of the application 2B as a current process or a standby process, and update the process control table 110 to quickly respond to the replacement of process.

As described, redundant processes are activated in advance as applications 2B according to the present embodiment. Thus, there is no time loss until the business transaction recovery by an initialization process or the like, the system throughput at the time of abnormal termination of application can be maintained, and a quick business transaction restart can be realized.

Furthermore, the influence on the performance of other processes during the process activation can be eliminated according to the present embodiment. The creation for making the applications redundant is not necessary according to the present embodiment, and the system independence can be improved.

A process flowchart executed by the message processing apparatus 1 including the structure of FIG. 1 in the present embodiment will be described using FIGS. 7 to 11.

Figure 7:
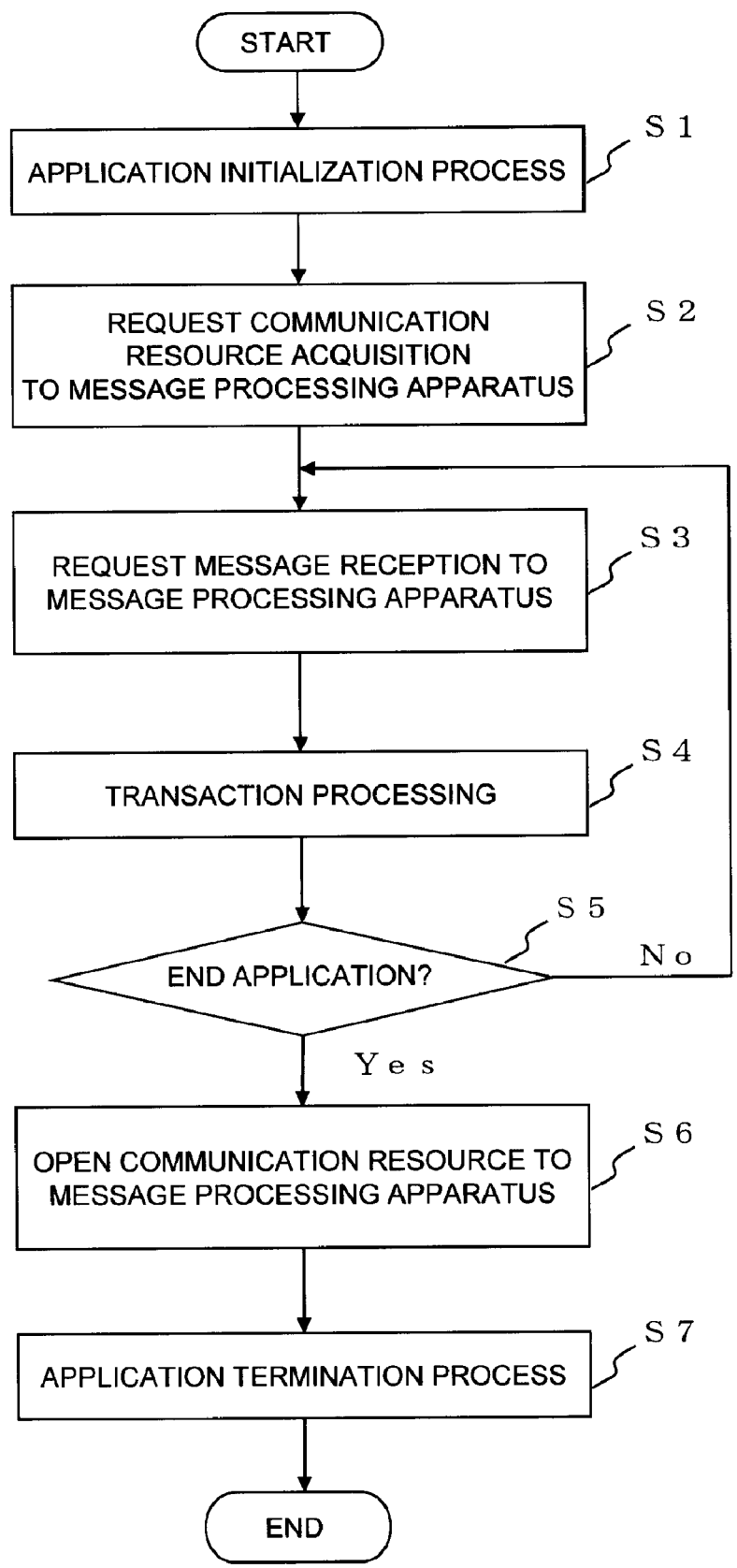
FIG. 7 illustrates a process flowchart of an application on the receiving side in the present embodiment.

FIG. 7 illustrates a process flowchart of an application 2B on the receiving side in the present embodiment.

After acquiring a communication resource to the message processing apparatus 1, the application 2B performs a processing which is simple such that requesting the message 100 and business transaction processing to the message 100 are repeated. The "acquisition of communication resource" denotes establishment of a state in which communication between the message processing apparatus 1 and the application 2B is possible, and the application 2B can receive the message 100. In FIG. 7, processes "acquire communication resource to message processing apparatus", "request message reception to message processing apparatus", and "release communication resource to message processing apparatus" are functions of the message processing apparatus 1, and internal processes are hidden from the application 2B.

The process of the application 2B starts when the user activates the application 2B. After the activation, the application 2B executes a predetermined initialization process (step S1), requests acquisition of a communication resource to the message processing apparatus 1 (step S2), and requests reception of the message 100 (request message) to the message processing apparatus 1 (step S3).

After receiving the requested message 100, the application 2B executes business transaction processing to the message 100 (step S4) and determines whether to end the process (step S5). When the process is not to be terminated, the application 2B repeats processes after S3 to continue the business transaction processing.

When the process is to be terminated in the step S5, the application 2B notifies the opening of the communication resource to the message processing apparatus 1 before terminating the process (step S6). The application 2B then executes a termination process of the application (step S7).

Figure 8A:
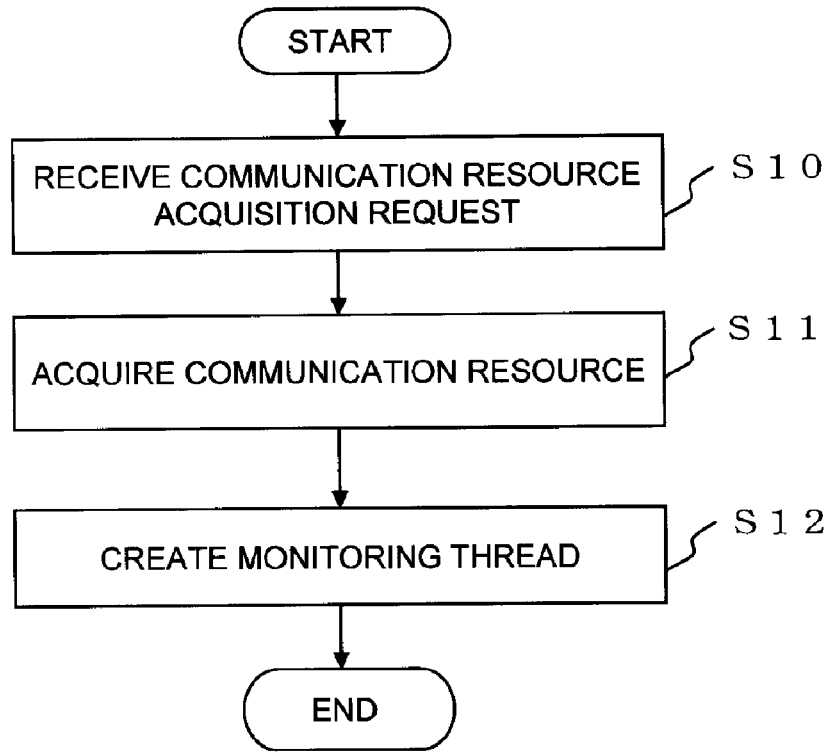
FIGS. 8A and 8B illustrate process flowcharts of an acquisition processing and a release processing of a communication resource according to the present embodiment.

FIG. 8A illustrates a process flowchart of an acquisition processing of a communication resource of the message processing apparatus 1 in the present embodiment.

The message reception control unit 11 of the message processing apparatus 1 starts the following process after receiving an acquisition request of a communication resource from the application 2B. The message reception control unit 11 receives a notification of the acquisition request of the communication resource from the application 2B (step S10). After receiving the notification of the acquisition request of the communication resource, the message reception control unit 11 acquires the communication resource (step S11). The message reception control unit 11 then creates a monitoring thread for monitoring the communication state between the application 2B and the message processing apparatus 1 (step S12).

The generated monitoring thread will be monitored in the process of the monitoring thread unit 12 described later with reference to FIG. 9.

Figure 8B:
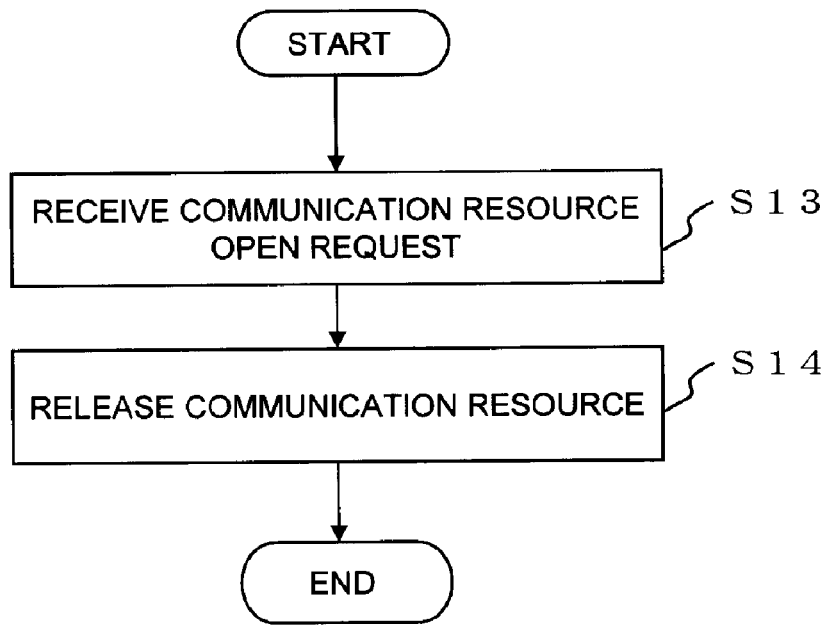

FIG. 8B illustrates a process flowchart of a release processing of the communication resource of the message processing apparatus 1 in the present embodiment.

The message reception control unit 11 of the message processing apparatus 1 receives a notification of the release request of the communication resource from the application 2B (step S13). After receiving the notification, the message reception control unit 11 opens the resource of communication with the process as a target of the application 2B (step S14). This concludes the release processing of the communication resource of the message processing apparatus 1.

Figure 9:
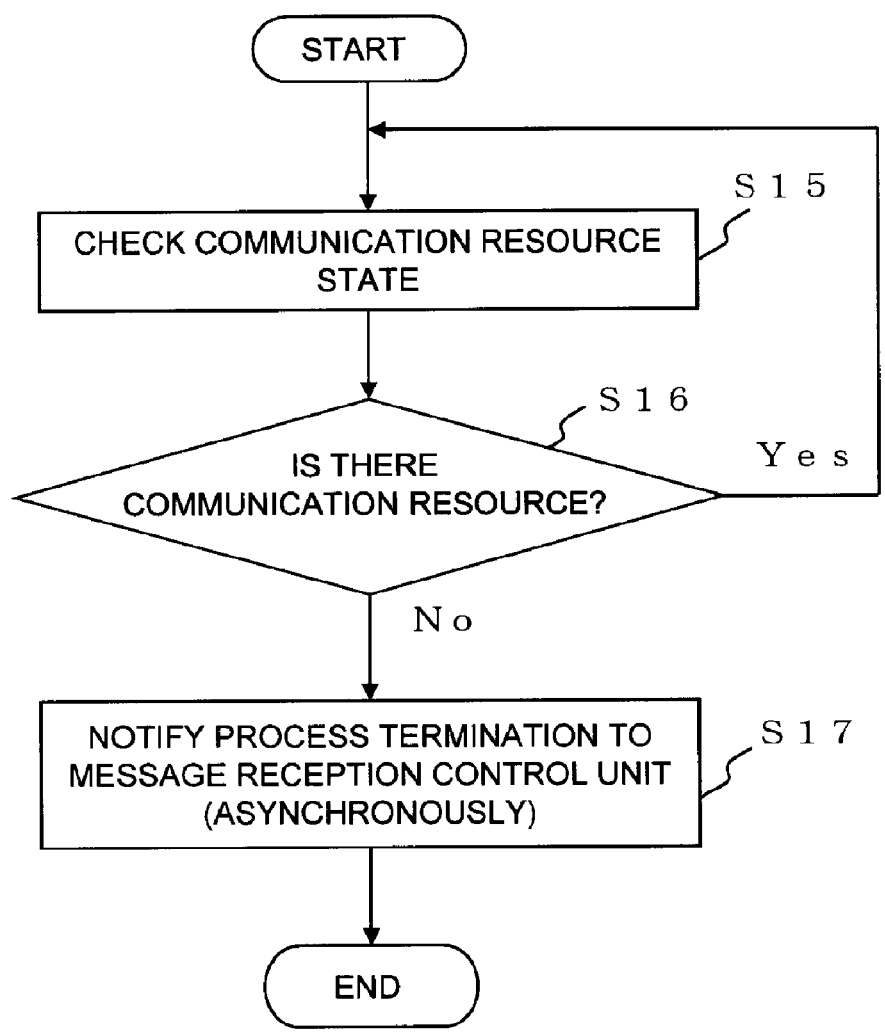
FIG. 9 illustrates a process flowchart of a monitor processing according the present embodiment.

FIG. 9 illustrates a monitor processing flowchart of the monitoring thread unit 12 included in the message processing apparatus 1 in the present embodiment.

When the message reception control unit 11 generates a monitoring thread, the monitoring thread unit 12 starts the following monitor processing. The monitoring thread unit 12 monitors the communication state between the message reception control unit 11 and the applications 2B as well as a state (communication resource state) such as whether there is a monitoring target (step 15).

Based on the result of monitoring, the monitoring thread unit 12 determines whether there is a communication resource (step S16). When the monitoring thread unit 12 determines that "there is a communication resource", the monitoring thread unit 12 repeats the processes of the step S15.

When the monitoring thread unit 12 determines that "there is no communication resource" in the step S16, the monitoring thread unit 12 determines that the process of the application 2B is finished or that the process is stopped due to a communication failure based on the monitoring of the monitoring thread, and transmits a notification of process termination to the message reception control unit 11 (step S17). The notification is asynchronously transmitted to the message reception control unit 11 from the monitoring thread unit 12.

Figure 10:
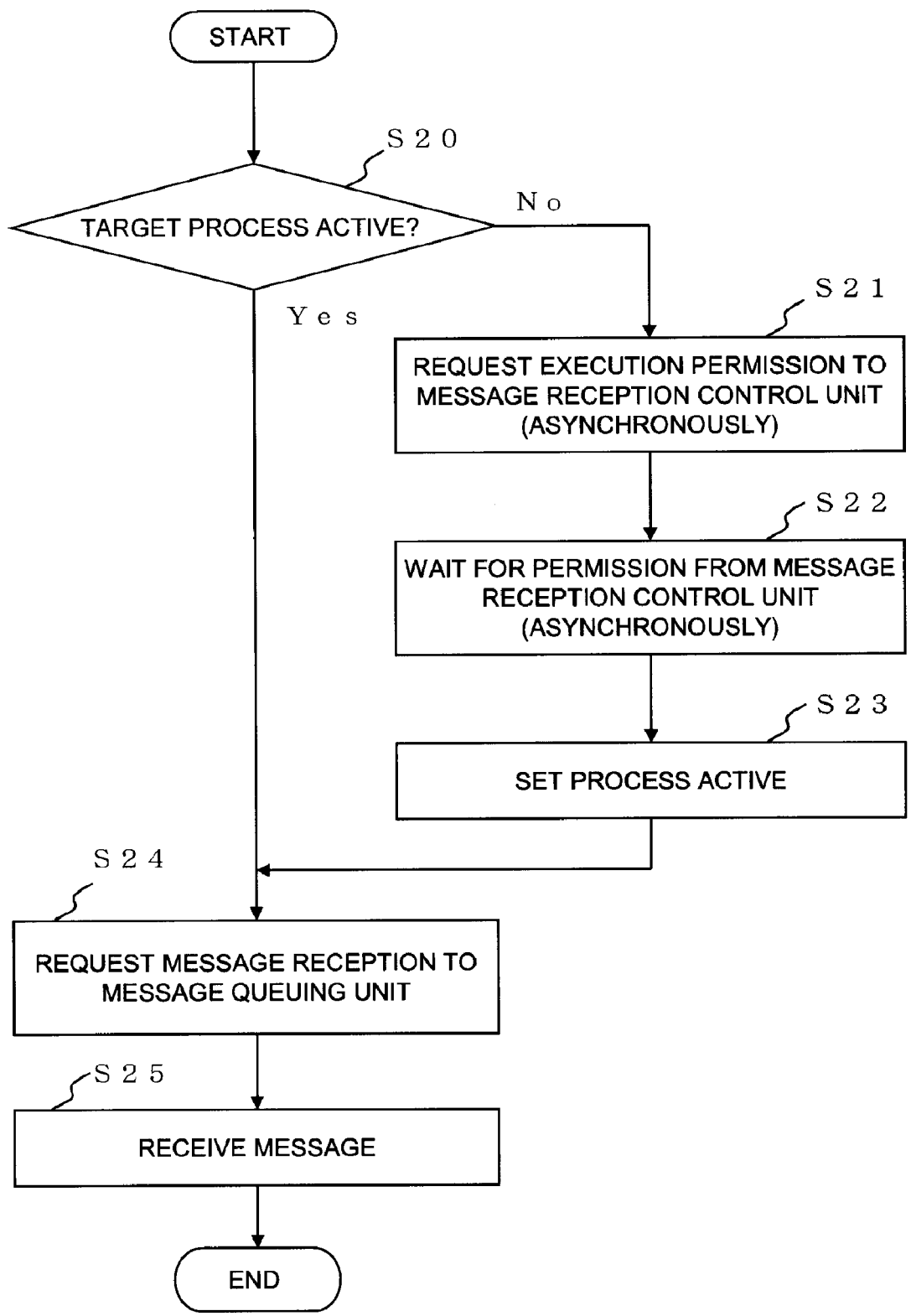
FIG. 10 illustrates a process flowchart of reception control during a message reception request according to the present embodiment.

FIG. 10 illustrates a process flowchart of reception control during a message reception request of the message processing apparatus 1 in the present embodiment.

The message processing apparatus 1 starts the following process after receiving the notification of the reception request of the message from the application 2B. When the notification of the reception request of the message 100 is received from the application 2B, the message reception control unit 11 of the message processing apparatus 1 determines whether the process of the application 2B which is transmitted the notification is current (step S20). For that purpose, the message reception control unit 11 refers to the process control table 110 and checks whether the process of the application 2B is a current process or a standby process.

When the process of the application 2B is not a current process (is a standby process), the standby process of the application 2B notifies an execution permission request for receiving the message 100 to the message reception control unit 11 (step S21) and waits until receiving a permission from the message reception control unit 11 (step S22). The processes of steps S21 and S22 are executed by asynchronous communication.

The message reception control unit 11, or the process control unit 13, sets corresponding data of the current flag 113 of the standby process on the process control table 110 to current (step S23). In this way, the message reception control unit 11 promotes a standby process to a current process when the number of the current processes has decreased depending on the generation or the termination of the processes.

On the other hand, when the process of the application 2B is a current process (not a standby process) in the step S20, the message reception control unit 11 requests reception of the message 100 related to the application 2B, which is the current process, to the message queuing unit 10 (step S24).

When the message queuing unit 10 receives the message 100 to the current process, the message reception control unit 11 extracts the message 100 received from the message queuing unit 10, and transmits the extracted message 100 to the current process of the application 2B (step S25).

In this way, the message processing apparatus 1 notifies the execution permission of the message reception to the process of the application 2B managed as an current process, and does not transmit a notification of the execution permission of the message reception to the process of the application 2B managed as a standby process. As a result, the application 2B on the receiving side receives the message 100 from the message processing apparatus 1 when the execution permission of the message reception is obtained from the message processing apparatus 1. On the other hand, the application 2B on the receiving side waits to receive the message 100 when the execution permission of the message reception is not obtained from the message processing apparatus 1.

Figure 11:
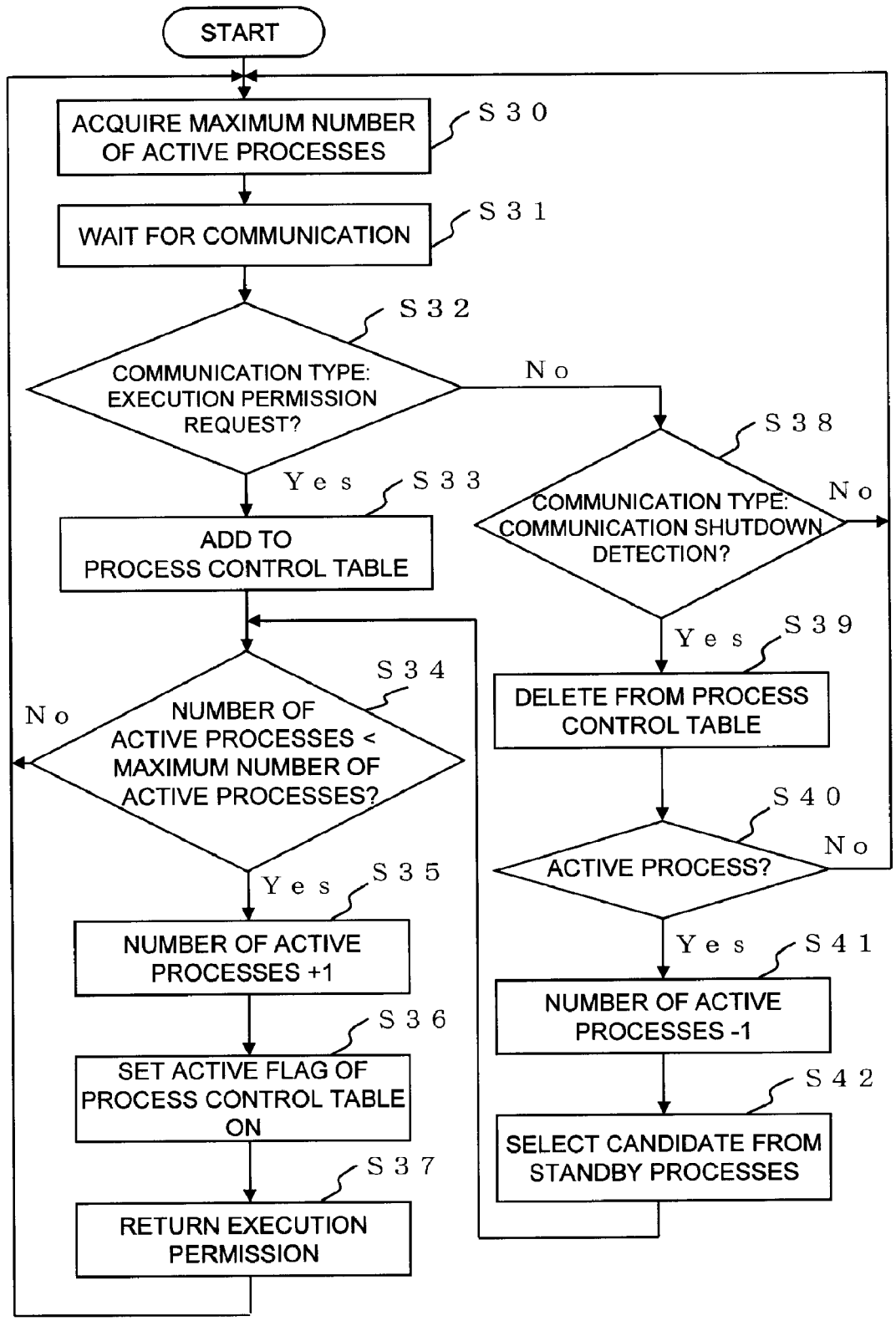
FIG. 11 illustrates a process flowchart of a management processing of a current process and standby process in the present embodiment.

FIG. 11 illustrates a process flowchart for managing the current processes and the standby processes of the message reception control unit 11 in the present embodiment.

The message reception control unit 11 starts the following process to manage the current processes and the standby processes from the standby state for communication with the applications 2B. The message reception control unit 11 acquires the maximum number of the current processes set by the user (step S30), and waits for the notification of a query or the like from the applications 2B (step S31).

When the notification of a query or the like is received from the applications 2B, the message reception control unit 11 determines whether the communication type in the content of the notification is an execution permission request (step S32). When the communication type is the execution permission request, the process control unit 13 of the message reception control unit 11 adds data, such as the process identifier 111 of the sender, to the process control table 110 (step S33).

The process control unit 13 further determines whether the number of the current processes is smaller than the maximum number of current processes (set by the user) (step S34).

When the number of the current processes is not smaller than (greater) the maximum number of the current processes, the process control unit 13 regards the process to be a standby process and returns to the process of step S30 without returning the notification of "execution permission". As a result, the application 2B of the sender regarded as a standby process is switched to the response standby state.

When the number of the current processes is smaller than the maximum number of the current processes in the step S34, the process control unit 13 adds the process including the added process identifier to the current process, executes "number of current processes+1", and stores the calculation result in a memory included in the process control unit 13 (step S35). In addition, the process control unit 13 sets the current flag 113 of the data of the added process to "ON" in the process control table 110 (step S36). The message reception control unit 11 then returns the notification of "execution permission" to the current process of the applications 2B, in which the current flag 113 is set to "ON", based on the process control table 110 (step S37).

When the communication type in the content of the notification of the application 2B is not the execution permission request in the step S32, the message reception control unit 11 further determines whether the communication type is communication failed detection (process failed) (step S38). When the communication type is not the communication failed detection, the message reception control unit 11 repeats the processes of the step S30.

When the communication type is the communication failed detection, the process control unit 13 deletes the data of the corresponding process from the process control table 110 (step S39). The process control unit 13 then determines whether the process of the deleted data is a current process (step S40). When the process is not a current process, the message reception control unit 11 repeats the processes of the step S30.

When the process is a current process, the message reception control unit 11 subtracts 1 from the number of the current processes stored in the memory included in the process control unit 13 and stores the number of the current processes of the calculation result in the memory (step S41). The process control unit 13 then selects a standby process from the process control table 110 according to the order of generation of processes, selects the standby process as a candidate of the current process (step S42), and repeats the processes of the step S34.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the sprit and scope of the invention.

What is claimed is:

1. A method for transmitting a message that is received by a computer to an application, the method comprising:
    deciding applications of N each of which receives a message among applications of M each of which maintains a state which can be in communication with the computer based on a number M and a number N, the number M being a number of same applications each of which maintains the state which can be in communication with the computer, the number N being equal with or a smaller value than the number M and a number of applications each of which receives the message;
    setting a control table that stores data indicating an application receives the message for each of the applications of N, and data indicating an application maintains the state which can be in communication with the computer for each of the applications other than the applications of N;
    receiving a message whose destination is any one of the applications of M;
    determining whether the destination of the message that is received by the computer is any one of the applications of N based on the control table to permit reception of the message at the destination; and
    transmitting the message that is received to an application that is the destination of the message that is received by the computer based on the permission, when the destination of the message that is received is any one of the applications of N, whereby the message whose destination is any one of the applications of N is transmitted to the destination.

2. The method according to claim 1, further comprising:
    storing control information to a storage unit, the control information including information to identify each of the applications and information indicating whether each of the same applications each of which maintains the state which can be in communication with the computer is an application that receives the message or that does not receive the message; and
    updating the control information to select at least one application as an application that receives the message, when the application that is the destination of the message is in an abnormal state, the one application being selected from applications that are indicated as applications that do not receive the message in the control information based on the number N which is the number of applications each of which receives the message.

3. A computer readable, non-transitory medium storing a program for transmitting a message that is received by a computer to an application, the program causing the computer to execute the operations of:

deciding applications of N each of which receives a message among applications of M each of which maintains a state which can be in communication with the computer based on a number M and a number N, the number M being a number of same applications each of which maintains the state which can be in communication with the computer, the number N being equal with or a smaller value than the number M and a number of applications each of which receives the message;

setting a control table that stores data indicating an application receives the message for each of the applications of N, and data indicating an application maintains the state which can be in communication with the computer for each of the applications other than the applications of N;

receiving a message whose destination is any one of the applications of M;

determining whether the destination of the message that is received by the computer is any one of the applications of N based on the control table to permit reception of the message at the destination; and transmitting the message that is received to an application that is the destination of the message that is received by the computer based on the permission, when the destination of the message that is received is any one of the applications of N, whereby the message whose destination is any one of the applications of N is transmitted to the destination.

* * * * *